US012049186B1

(12) United States Patent
Treglown et al.

(10) Patent No.: US 12,049,186 B1
(45) Date of Patent: Jul. 30, 2024

(54) KNEE AIRBAG FOR A VEHICLE

(71) Applicant: Autoliv ASP, Inc., Ogden, UT (US)

(72) Inventors: Aaron Treglown, Ogden, UT (US); Michael Daines, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 18/107,332

(22) Filed: Feb. 8, 2023

(51) Int. Cl.
| | | |
|---|---|---|
| *B60R 21/231* | (2011.01) | |
| *B60R 21/206* | (2011.01) | |
| *B60R 21/2338* | (2011.01) | |
| *B60R 21/2346* | (2011.01) | |
| *B60R 21/235* | (2006.01) | |
| *B60R 21/233* | (2006.01) | |

(52) U.S. Cl.
CPC .......... *B60R 21/231* (2013.01); *B60R 21/206* (2013.01); *B60R 21/2346* (2013.01); *B60R 21/235* (2013.01); *B60R 2021/23169* (2013.01); *B60R 2021/23324* (2013.01); *B60R 2021/23382* (2013.01); *B60R 2021/23547* (2013.01)

(58) Field of Classification Search
CPC .......... B60R 2021/23169; B60R 2021/23547; B60R 2021/23382; B60R 2021/0051; B60R 2021/0053; B60R 2021/23308; B60R 2021/23316; B60R 2021/23324; B60R 21/231; B60R 21/2346; B60R 21/235; B60R 21/206; B60R 21/233; B60R 21/2338; B60R 21/205
USPC .................................. 280/730.1, 732, 743.2
See application file for complete search history.

(56) References Cited

U.S. PATENT DOCUMENTS

| | | | | |
|---|---|---|---|---|
| 6,382,662 B1 * | 5/2002 | Igawa | ................... | B60R 21/233 |
| | | | | 280/729 |
| 9,592,787 B2 * | 3/2017 | Jung | ..................... | B60R 21/237 |

(Continued)

FOREIGN PATENT DOCUMENTS

| | | | |
|---|---|---|---|
| JP | 2005186886 A | * | 7/2005 |
| WO | WO-2017140521 A1 | * | 8/2017 |

OTHER PUBLICATIONS

U.S. Appl. No. 18/372,728, filed Sep. 26, 2023.

*Primary Examiner* — Keith J Frisby
(74) *Attorney, Agent, or Firm* — Harness, Dickey & Pierce, P.L.C.; Stephen T. Olson

(57) ABSTRACT

A knee airbag includes a front panel, rear panel coupled to the front panel to define an inflation chamber, and an intermediate panel between the front panel and the rear panel and within the inflation chamber. The intermediate panel is connected to the front panel and the rear panel at various locations between a proximal end and a distal end of the intermediate panel to control an inflated configuration of the knee airbag. First and second suspension portions suspend the proximal end of the intermediate panel between the front panel and the rear panel and are permeable to the passage of inflation gases. The first suspension portion extends between the front panel and the proximal end of the intermediate panel. The second suspension portion extends between the rear panel and the proximal end of the intermediate panel. An inflator for inflating the knee airbag is disposed in the inflation chamber at a proximal end of the knee airbag. An inflation gas diffusing arrangement is disposed in the inflation chamber between the inflator and the proximal end of the intermediate panel.

20 Claims, 6 Drawing Sheets

(56) References Cited

U.S. PATENT DOCUMENTS

2007/0145730 A1\* 6/2007 Choi .................. B60R 21/2346
                                                    280/740
2010/0253051 A1\* 10/2010 Moritani ............ B60R 21/2346
                                                    280/730.1

\* cited by examiner

KNEE AIRBAG FOR A VEHICLE

FIELD

The present disclosure generally concerns inflatable occupant restraint systems for vehicles. More particularly, the present disclosure relates to a knee airbag arrangement for a vehicle.

BACKGROUND

This section provides background information related to the present disclosure which is not necessarily prior art.

Inflatable occupant restraints or airbags are commonly included on motor vehicles for passive occupant protection. Airbags used for frontal impact protection are generally installed in the vehicle steering wheel for the driver and behind the vehicle instrument panel for other front seat occupants. In addition to frontal impact protection, inflatable restraints are used for occupant protection from side impacts. For example, side curtain airbags are typically mounted along the roof rail of a vehicle and deploy in a downward direction to provide an energy absorbing structure between the head and upper torso of an occupant and the vehicle interior components.

In the event of an accident or impending accident, a sensor within the vehicle measures abnormal deceleration, for example, the airbag is triggered to inflate within a few milliseconds with gas produced by a device commonly referred to as an "inflator". The inflated airbag cushions the vehicle occupant from impact forces.

Inflatable occupant restraint systems may include a knee airbag arrangement for protecting the knees and/or lower legs of an occupant during a collision event. Such knee airbag arrangements generally include an inflatable knee airbag for absorbing at least a portion of the impact energy otherwise directed to an occupant's knees and lower legs during a collision event, especially by restraining the occupant by limiting forward movement of the knees and lower legs.

One suitable knee airbag arrangement is shown and described in commonly assigned U.S. Pat. No. 9,592,787 (the '787 patent). The '787 patent discloses a knee airbag arrangement having an inflatable cushion configured and arranged to rapidly deploy between the knees of a passenger and an instrument panel of the vehicle. The inflatable cushion of the knee airbag arrangement includes a front panel, a rear panel coupled to the front panel, and a hinge portion having a thin inflation section at a position corresponding to a housing connecting portion. The inflatable cushion is connected to a housing connection portion at the hinge portion upon inflation. The '787 patent is incorporated by reference as if fully set forth herein.

While known occupant restraint systems including a knee airbag arrangement such as the knee airbag arrangement shown and described in the '787 patent have proven to be suitable for their intended uses, a continuous need for improvement in the relevant art remains.

SUMMARY

This section provides a general summary of the disclosure, and is not a comprehensive disclosure of its full scope or all of its features.

It is a general object of the present teachings to provide a knee airbag that effectively diffuses inflation gases to maintain structural integrity of support members supporting an intermediate panel within an inflation chamber.

In accordance with one particular aspect, the present teachings provide a knee airbag for a vehicle. The knee airbag includes a front panel, a rear panel coupled to the front panel to define an inflation chamber, and an intermediate panel between the front panel and the rear panel and within the inflation chamber. The intermediate panel is connected to the front panel and the rear panel at various locations between a proximal end and a distal end of the intermediate panel to control an inflated configuration of the knee airbag. First and second suspension portions suspend the proximal end of the intermediate panel between the front panel and the rear panel and are permeable to the passage of inflation gases. The first suspension portion extends between the front panel and the proximal end of the intermediate panel. The second suspension portion extends between the rear panel and the proximal end of the intermediate panel. An inflator for inflating the knee airbag is disposed in the inflation chamber at a proximal end of the knee airbag. An inflation gas diffusing arrangement is disposed in the inflation chamber between the inflator and the proximal end of the intermediate panel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments, not all possible implementations, and are not intended to limit the scope of the present disclosure.

DETAILED DESCRIPTION

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. The phrase "fluid communication" refers to two features that are connected such that a fluid within one feature is able to pass into the other feature. "Exemplary" as used herein means serving as a typical or representative example or instance and does not necessarily mean special or preferred.

In the following description, directional terms such as upper direction, lower direction, forward direction, rearward direction, and the like will be defined based on a knee airbag in a state that an associated airbag housing is coupled to a lower portion of an instrument panel. That is, a direction toward the roof of a vehicle is defined as an upper direction (U), a direction toward the bottom of the vehicle is defined as a lower direction (L), a direction toward a passenger is defined as a rearward direction (R), and a direction toward a front of the vehicle is defined as a forward direction (F). The terms distal and proximal used to describe the knee airbag or elements thereof shall be understood to be with reference to a deployed orientation of the knee airbag. Explaining further, the term proximal refers to being at or toward the end of the knee airbag at the housing and the term distal refers to being at or toward the end of the knee airbag opposite the housing.

Figure 1:
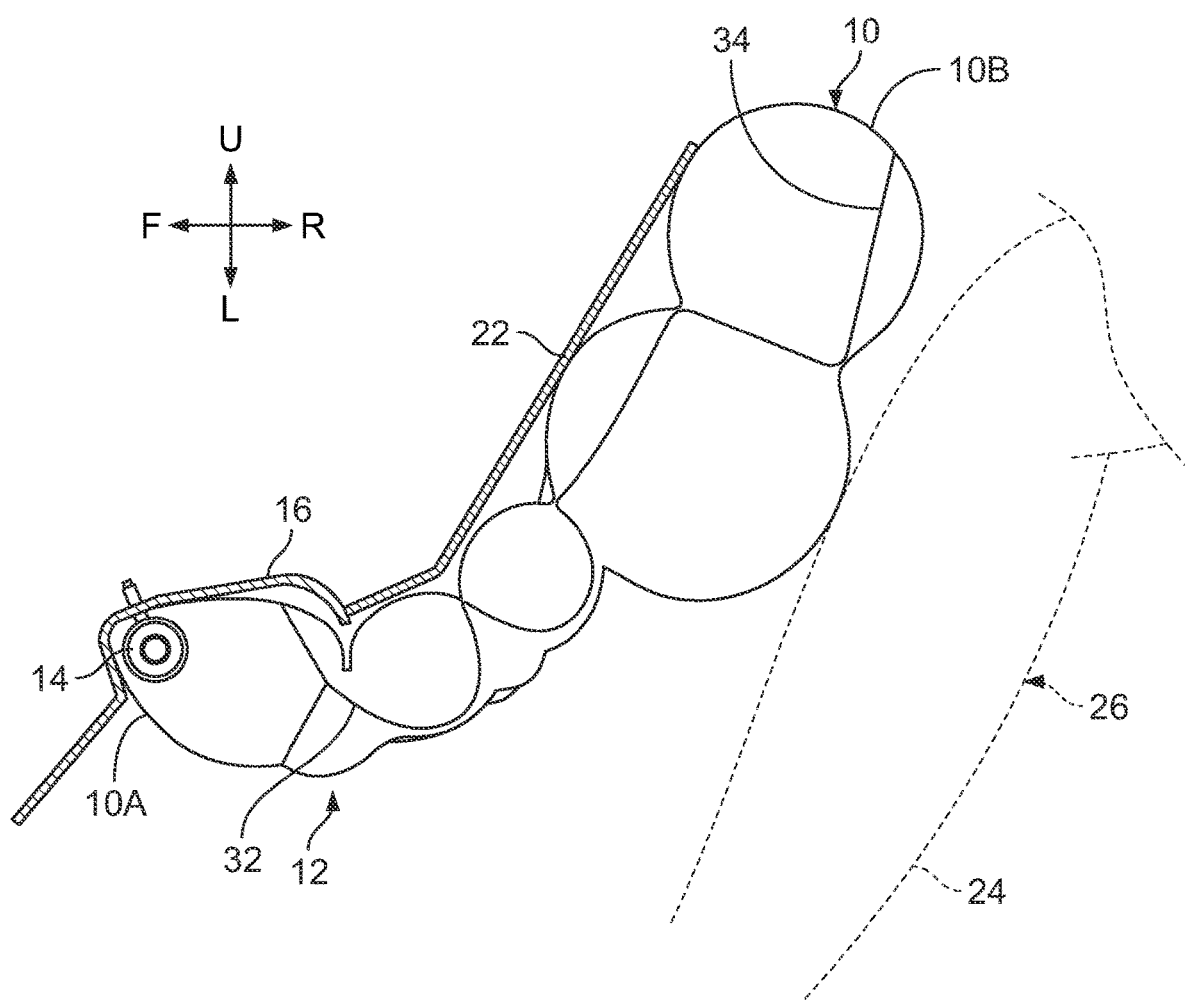
FIG. 1 is a side view of a knee airbag for a vehicle in accordance with the present teachings, the knee airbag shown inflated and operatively disposed between the knees of a passenger and an instrument panel of the vehicle.
Figure 2:
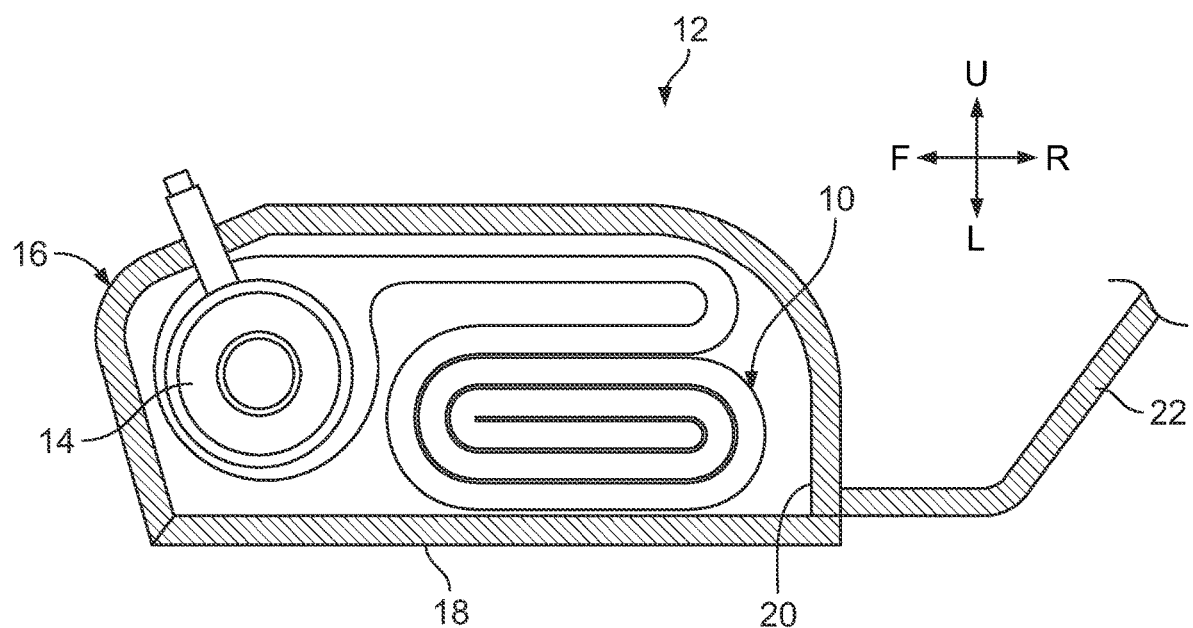
FIG. 2 is longitudinal cross-sectional view of the knee airbag of FIG. 1, the knee airbag shown prior to deployment within an airbag housing, and operatively associated with an inflator.

With particular reference to the environmental views of FIGS. 1 and 2, a knee airbag for a vehicle in accordance with the present teachings is illustrated and generally identified at reference character 10. The knee airbag 10 is shown incorporated into a knee airbag arrangement 12 that further includes an inflator 14 for supplying inflation gases to the knee airbag 10 upon sensing of predetermined collision events, and an airbag housing 16 receiving the knee airbag 10 and the inflator 14. The airbag housing 16 includes a door 18 normally covering an opening 20 of the airbag housing 16. The knee airbag arrangement 12 is installed within the vehicle at a lower portion of an instrument panel 22. Upon deployment, the knee airbag 10 is operatively disposed in a longitudinal direction (e.g., in a F to R direction) between the knees 24 of a passenger 26 and the instrument panel 22 of the vehicle.

Figure 4:
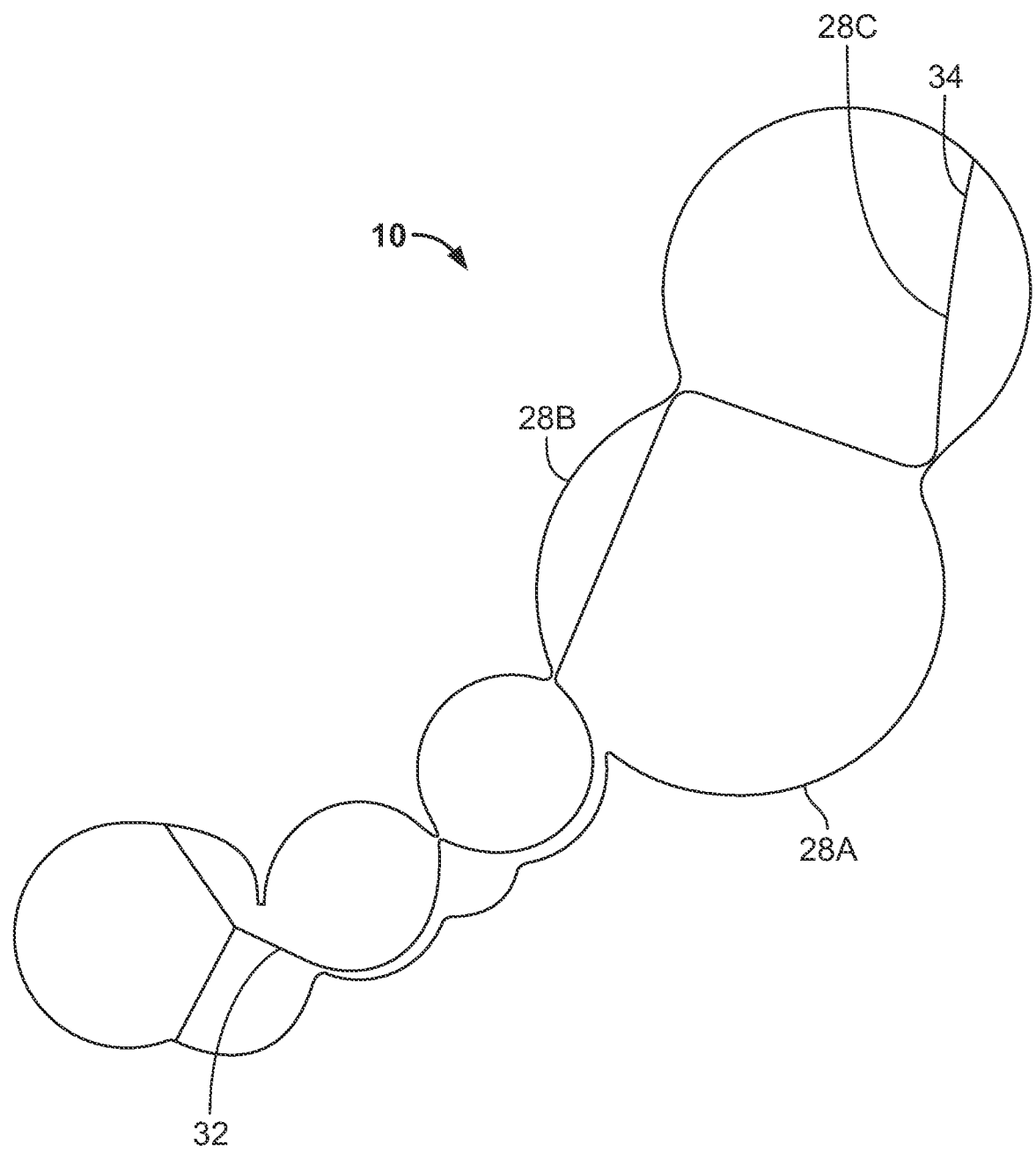
FIG. 4 is a simplified longitudinal cross-sectional view of a portion of the knee airbag of the present teachings illustrating an exemplary relationship between front, rear and intermediate panels of the knee airbag.

With continued reference to the environmental views of FIGS. 1 and 2 and additional reference to the remaining figures, the details of the knee airbag 10 of the present teachings will be further described. The knee airbag 10 is shown to generally include a front panel 28A and a rear panel 28B that cooperate to define an inflation chamber 30. The knee airbag 10 is further shown to generally include an intermediate panel 28C that cooperates with front and rear panels 28A and 28B to define a desired deployment shape of the knee airbag 10. As shown in the simplified cross-sectional view of FIG. 4, the intermediate panel 28C is disposed in the inflation chamber 30, extends at least substantially across the inflation chamber 30 in an airbag lateral direction, and at various locations between a proximal end 32 and a distal end 34 of the intermediate panel 28C is attached to both the front panel 28A and the rear panel 28B.

A length of the front panel 28A is shorter than a length of the rear panel 28B. Thus, when the front and rear panels 28A and 28B are internally connected with the intermediate panel 28C, a predetermined deployment profile or shape is defined. It will be understood that the particular deployment profile shown in the drawings and the corresponding attachment locations between the intermediate panel 28C and the upper panel 28A, and the corresponding attachment locations between the intermediate panel 28C and the lower panel 28B are merely exemplary. The particular attachment locations between the panels 28A-28C and the length difference between the upper panel 28A and the lower panel 28B cooperate to define an airbag shape that unfolds and deploys between the knees 24 of the passenger 26 and the instrument panel 22 of the vehicle to protect the passenger 26.

The knee airbag 10 is illustrated to further include first and second suspension portions 36A and 36B suspending the proximal end 32 of the intermediate panel 28C between the front panel 28A and the rear panel 28B. The first and second suspension portions 36A and 36B are permeable to the passage of inflation gases for inflating the knee airbag 10 from a proximal end 10A of the airbag 10 to a distal end 10B of the airbag 10 and cooperate to suspend the proximal end 32 of the intermediate panel within the inflation cavity 30 such that the proximal end 32 of the intermediate panel 28C "floats" between the front panel 28A and the rear panel 28B. The first suspension portion 36A extends between the front panel 28A and the proximal end 32 of the intermediate panel 28A. The second suspension portion 36B extends between the rear panel 28B and the proximal end 32 of the intermediate panel 28C.

In one particular application, the knee airbag 10 of the present teachings may be a one piece woven (OPW) airbag 10. In such an example, the front panel 28A, the rear panel 28B and the intermediate panel 28C may be formed by weaving using OPW technology. In such an example, the first and second suspension portions 36A and 36B may also be formed with the front panel 28A, the rear panel 28B and the intermediate panel 28C using OPW technology. The front and rear panels 28A and 28B may be conventionally formed with the OPW technology to include waft and weft threads. The waft threads extend in a lateral direction across the knee airbag 10 and the weft threads extend in a longitudinal direction perpendicular to the waft threads and in a direction from the proximal end 10A of the airbag 10 to the distal end 10B of the airbag 10. In a known manner, the waft and weft threads of the front panel 28A are interwoven with the waft and weft threads of the rear panel 28B at a perimeter of the knee airbag 10 to seal or close the inflation chamber 30.

The first and second suspension portions 36A and 36B may be integrally woven with the knee airbag 10. Alternatively, the first and second suspension portions 36A and 36B may each include one or more tethers, or may include combinations of weft threads and tethers. In one particular embodiment, the first and second suspension portions 36A and 36B may each include a plurality of additional weft threads of the OPW knee airbag 10. A first plurality of additional weft threads 42 (weft threads only without any waft threads) may be interwoven with the weft and waft threads of the front panel 28A and extend front the front panel 28A to the intermediate panel 28C. Similarly, a second plurality of additional weft threads (again weft threads only without any waft threads) may be interwoven with the weft and waft threads of the front panel 28A and extend front the rear panel 28B to the intermediate panel 28C. The first and second pluralities of weft threads substantially extend across the inflation chamber 30 in a lateral direction.

The first and second pluralities of additional weft threads and continue from the proximal end 32 of the intermediate panel 28C where they are woven with OPW technology along with waft threads to form the intermediate panel 28C to the distal end 10B of the knee airbag 10B. The first and second pluralities of additional weft threads allow inflation gases to more freely and more quickly flow from the inflator 14 to the distal end 10B of the knee airbag 10 for full inflation and deployment of the knee airbag 10.

The knee airbag 10 of the present teachings is further shown to include an inflation gas diffusing arrangement 46 for diffusing inflation gases generated by the inflator 14. The inflation gas diffusing arrangement 46 protects the functional integrity of the first and second pluralities of additional weft threads from the heat and pressures that may otherwise destroy this functional integrity. The inflation gas diffusing arrangement 46 is disposed in the inflation chamber 30 between the inflator 14 and the proximal end 32 of the intermediate panel 28C.

Figure 3:
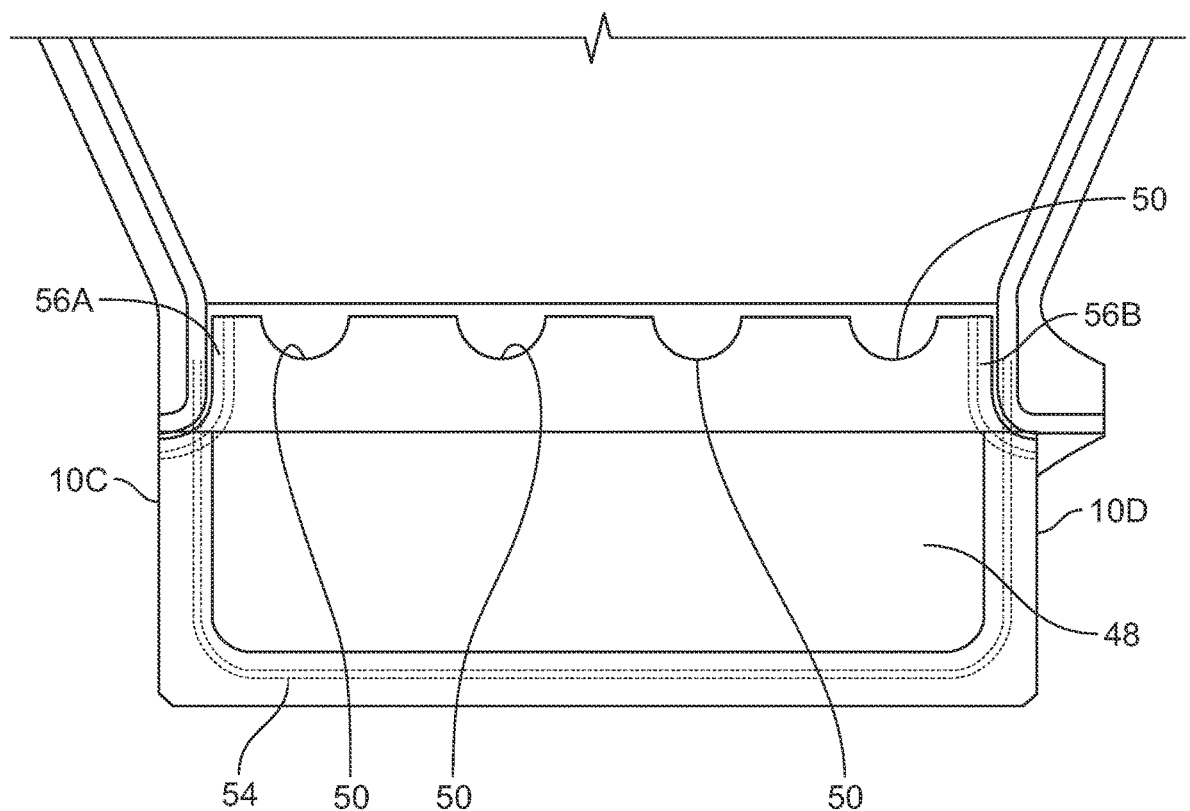
FIG. 3 is a front view of a portion of the knee airbag in accordance with the present teachings, illustrating stitching around a perimeter of the knee airbag and a diffuser panel of the inflation gas diffusing arrangement.

The inflation gas diffusing arrangement 46 is illustrated to include a diffuser panel 48 having a plurality of holes or diffusion holes 50 for diffusing the inflation gases produced by the inflator 14. As perhaps best shown in FIG. 3, the holes of the plurality of holes 50 are formed in a distal-most portion of the diffuser panel 48 when the diffuser panel is folded within the inflation chamber 30. The diffuser panel 48 includes first and second ends 48A and 48B captured between the front and rear panels 28A and 28B of the knee airbag 10 at the proximal end 10A of the airbag 10.

Figure 5:
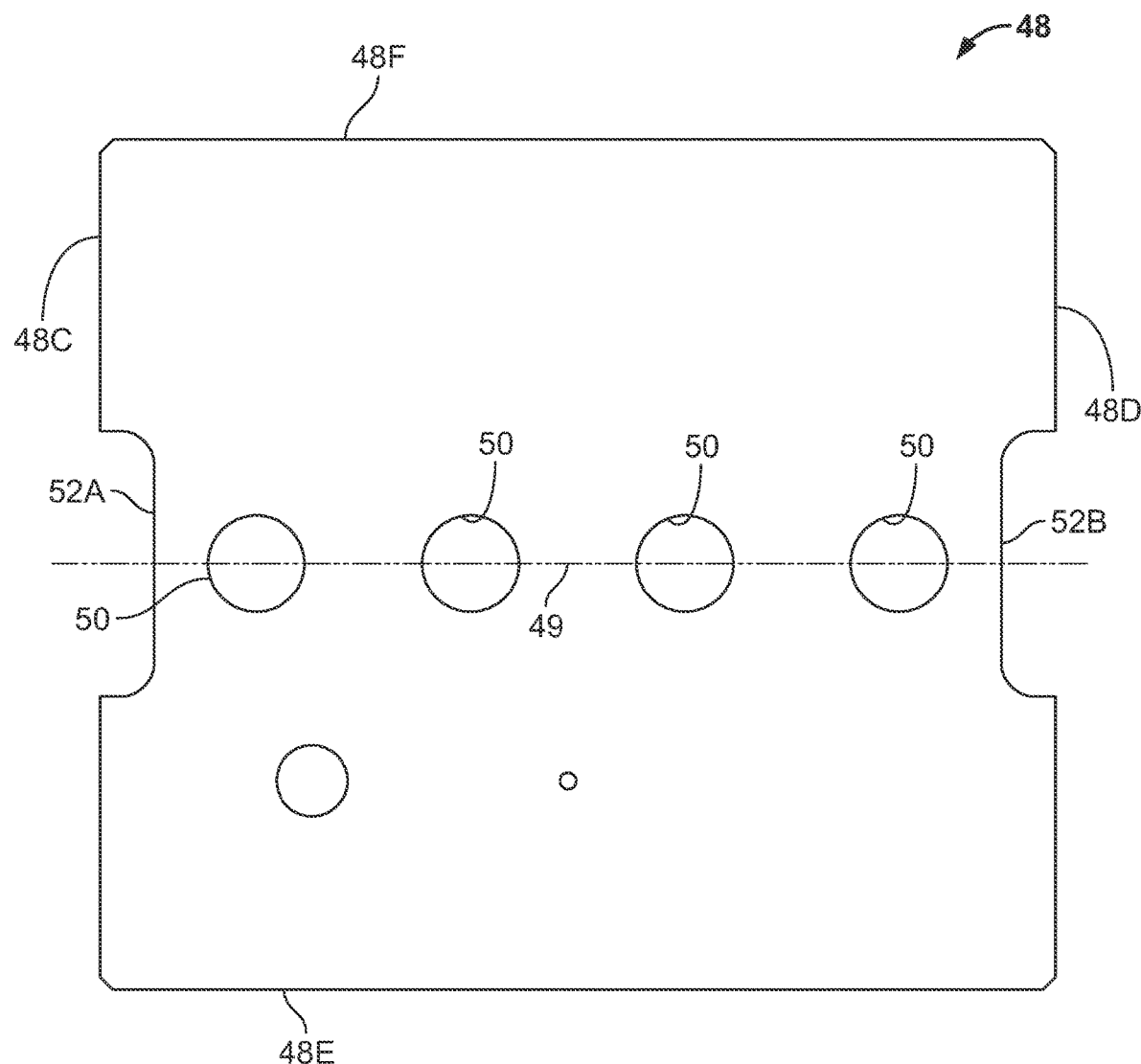
FIG. 5 is a plan view of a diffuser panel of the inflation gas diffusing arrangement of the knee airbag of the present teachings.
Figure 6:
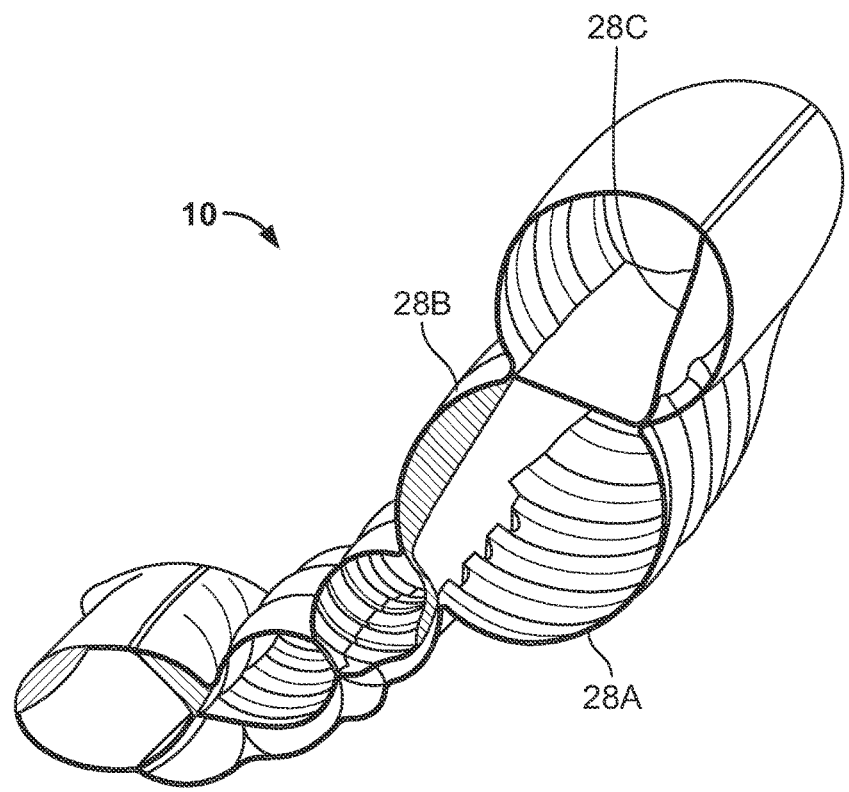
FIG. 6 is a longitudinal sectional view of a portion of the knee airbag of the present teachings, further illustrating the inflation gas diffusing arrangement and the front, rear and intermediate panels of the knee airbag.

As shown in FIG. 5, the diffuser panel 48 is rectangular in shape with first and second lateral sides 48C and 48D and first and second longitudinal sides 48E and 48F. The holes of the plurality of holes 50 extend laterally across the diffuser panel 48. As illustrated, the holes of the plurality of holes 50 may extend laterally across the diffuser panel 48 at a longitudinal center 49 of the diffuser panel 48.

The diffuser panel 48 is shown to further include first and second notches 52A and 52B at the first and second lateral sides 48C and 48D thereof, respectively. As will be appreciated below, the notches 52A and 52B allow a distally-most portion of the folded diffuser panel 48 to be inwardly spaced from a perimeter of the knee airbag 10. The first and second notches 52A and 52B may be centered along the longitudinal center line 49 of the diffuser panel 48. As illustrated, the first and second notches 52A and 52B may have a length in a longitudinal direction greater than a diameter of each of the holes of the plurality of holes 50.

The knee airbag 10 may further include a seam 54 at the proximal end 10A of the knee airbag 10 closing a portion of the inflation chamber 30. For purposes of improving the integrity of the inflation chamber 30 of the OPW knee airbag 10, the seam 54 may be spaced from a periphery of the knee airbag 10. The seam 54 may extend laterally across the proximal end 10A of the knee airbag 10 and longitudinally along portions of the lateral sides 10C and 10D of the knee airbag 10.

The knee airbag 10 may further include first and second further seams 56A and 56B proximate the first and second lateral sides 48C and 48D of the diffuser panel 48, respectively. The first and second further seams 56A and 56B may extend along the first and second notches 52A and 52B, respectively, when the diffuser panel 48 is folded along the longitudinal centerline 49. The first and second further seams 56A and 56B connect the front panel 28A, the rear panel 28B and the diffuser panel 48. As illustrated, both of the first and second further seams 56A and 56B extend from one of the lateral sides 10C and 10D of the knee airbag 10 laterally inwardly and across the seam 54, and longitudinally in a direction toward the distal end of the knee airbag 10.

Figure 7:
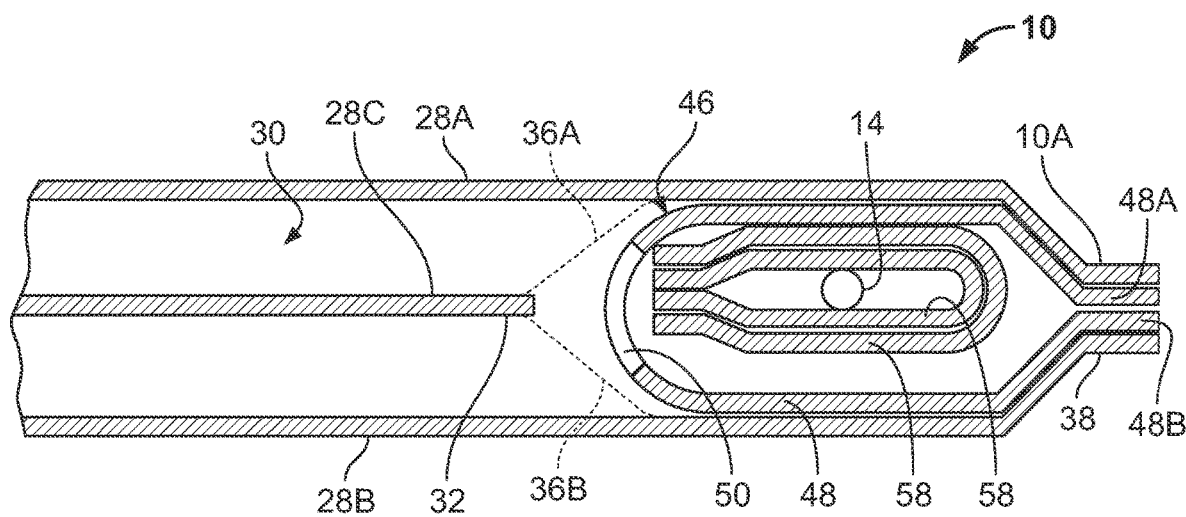
FIG. 7 is sectional view taken through a proximal end of the knee airbag.

The inflation gas diffusing arrangement 46 may further include one or more heat patches 58. As shown in FIG. 7, the inflation gas diffusing arrangement 46 includes 2 heat patches 58 for protecting the diffuser panel 48. One or both of the heat patches 58 may be consumed by the heat of the inflation gases during inflation of the knee airbag 10.

Deployment of the knee airbag 10 occurs in response to activation of the inflator 14. The inflator 14 activates in response to a sensed condition indicating a predetermined vehicle collision or event. The inflator 14, its activation, and the sensing of the vehicle collision or event will be understood to be conventional insofar as the present teachings are concerned. The inflator 14 delivers inflation gases through the holes 50 of the diffuser panel 48 to inflate the knee airbag 10.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. A knee airbag comprising:
a front panel;
a rear panel coupled to the front panel to define an inflation chamber;
an intermediate panel between the front panel and the rear panel and within the inflation chamber, the intermediate panel connected to the front panel and the rear panel at various locations between a proximal end and a distal end of the intermediate panel to control an inflated configuration of the knee airbag,
first and second suspension portions suspending the proximal end of the intermediate panel between the front panel and the rear panel and permeable to a passage of inflation gases, the first suspension portion extending between the front panel and the proximal end of the intermediate panel, the second suspension portion extending between the rear panel and the proximal end of the intermediate panel;
an inflator for inflating the knee airbag disposed in the inflation chamber at a proximal end of the knee airbag; and
an inflation gas diffusing arrangement disposed in the inflation chamber between the inflator and the proximal end of the intermediate panel,
wherein the knee airbag is a OPW airbag and the intermediate panel transitions in a proximal direction at the distal end from only weft threads to a weave pattern including both weft and waft threads.

2. The knee airbag of claim 1, wherein the inflation gas diffusing arrangement includes a diffuser panel having a plurality of holes for diffusing inflation gases produced by the inflator.

3. The knee airbag of claim 2, wherein the holes of the plurality of holes are formed in a distal most portion of the diffuser panel.

4. The knee airbag of claim 2, wherein the diffuser panel includes first and second ends captured between the front and rear panels of the knee airbag at the proximal end of the knee airbag.

5. The knee airbag of claim 2, wherein the diffuser panel is rectangular in shape with first and second lateral sides and first and second longitudinal sides.

6. The knee airbag of claim 5, wherein the plurality of holes extend laterally across the diffuser panel.

7. The knee airbag of claim 6, wherein the plurality of holes extends laterally across the diffuser panel at a longitudinal center of the diffuser panel.

8. The knee airbag of claim 5, wherein the diffuser panel includes first and second notches at the first and second lateral sides thereof, respectively.

9. The knee airbag of claim 8, wherein the first and second notches are longitudinally centered on a longitudinal center of the diffuser panel.

10. The knee airbag of claim 9, further comprising first and second seams proximate the first and second lateral sides of the diffuser panel, the first and second seams extending along the first and second notches, respectively, when the diffuser panel is folded along a longitudinal centerline, the first and second seams connecting the front panel, the rear panel and the diffuser panel.

11. The knee airbag of claim 10, wherein the first and second seams extend from a first lateral side of the knee airbag laterally inwardly and longitudinally in a direction toward a distal end of the knee airbag.

12. The knee airbag of claim 8, wherein the first and second notches and the holes of the plurality of holes are centered on a longitudinal center of the diffuser panel and the first and second notches have a length in a longitudinal direction greater than a diameter of each of the holes of the plurality of holes.

13. The knee airbag of claim 1, further comprising a seam at the proximal end of the knee airbag closing a portion of the inflation chamber, the seam spaced from a periphery of the knee airbag, and laterally across the proximal end of the knee airbag and longitudinally along portions of lateral sides of the knee airbag.

14. A knee airbag comprising:
a front panel;
a rear panel coupled to the front panel to define an inflation chamber;
an intermediate panel between the front panel and the rear panel and within the inflation chamber, the intermediate panel connected to the front panel and the rear panel at various locations between a proximal end and a distal end thereof to control an inflated configuration of the knee airbag;
first and second suspension portions suspending the proximal end of the intermediate panel between the front panel and the rear panel, the first and second suspension portions extending from the front and rear panels, respectively, and including only weft threads; and
an inflator for inflating the knee airbag disposed in the inflation chamber at a proximal end of the knee airbag; and
an inflation gas diffusing arrangement disposed in the inflation chamber between the inflator and the proximal end of the intermediate panel,
wherein a seam extends around the proximal end of the knee airbag closing a portion of the inflation chamber, the seam spaced from a periphery of the knee airbag, the seam laterally extending across the proximal end of the knee airbag and longitudinally along portions of lateral sides of the knee airbag.

15. The knee airbag of claim 14, further comprising a diffuser panel including a plurality of holes for diffusing inflation gases produced by the inflator, the diffuser panel is rectangular in shape with first and second lateral sides and first and second longitudinal sides, the diffuser panel folded along a longitudinal centerline and the first and second longitudinal sides of the diffuser panel are captured between the front and rear panels at the proximal end of the knee airbag by the seam.

16. The knee airbag of claim 15, wherein the plurality of holes of the diffuser panel are formed along the longitudinal centerline thereof.

17. The knee airbag of claim 16, wherein the diffuser panel includes first and second notches longitudinally centered on a longitudinal center of the diffuser panel.

18. The knee airbag of claim 17, further comprising first and second further seams proximate the first and second lateral sides of the diffuser panel, the first and second further seams extending along the first and second notches, respectively, when the diffuser panel is folded along the longitudinal centerline, the first and second further seams connecting the front panel, the rear panel and the diffuser panel.

19. A knee airbag comprising:
a front panel;
a rear panel coupled to the front panel to define an inflation chamber;
an intermediate panel between the front panel and the rear panel and within the inflation chamber, the intermediate panel connected to the front panel and the rear panel at various locations between a proximal end and a distal end of the intermediate panel to control an inflated configuration of the knee airbag,
first and second suspension portions suspending the proximal end of the intermediate panel between the front panel and the rear panel and permeable to a passage of inflation gases, the first suspension portion extending between the front panel and the proximal end of the intermediate panel, the second suspension portion extending between the rear panel and the proximal end of the intermediate panel;
an inflator for inflating the knee airbag disposed in the inflation chamber at a proximal end of the knee airbag; and
an inflation gas diffusing arrangement disposed in the inflation chamber between the inflator and the proximal end of the intermediate panel,
wherein the inflation gas diffusing arrangement includes a diffuser panel having a plurality of holes for diffusing inflation gases produced by the inflator and first and second notches at first and second lateral sides thereof, respectively, the first and second notches longitudinally centered on a longitudinal center of the diffuser panel.

20. The knee airbag of claim 19, wherein the diffuser panel is rectangular in shape.

* * * * *